United States Patent [19]

Hertrich

[11] Patent Number: 4,809,110
[45] Date of Patent: Feb. 28, 1989

[54] NARROW CONTOUR HEAD ASSEMBLY

[75] Inventor: Friedrich R. Hertrich, Boulder, Colo.

[73] Assignee: Digital Equipment Corporation, Maynard, Mass.

[21] Appl. No.: 106,935

[22] Filed: Oct. 8, 1987

Related U.S. Application Data

[63] Continuation of Ser. No. 669,410, Nov. 8, 1984, abandoned.

[51] Int. Cl.$^4$ ............................................. G11B 5/187
[52] U.S. Cl. .................................... 360/122; 360/121
[58] Field of Search ................ 360/122, 110, 119, 121

[56] References Cited

U.S. PATENT DOCUMENTS

| 3,573,769 | 4/1971 | Flora | 360/122 |
| 3,806,902 | 4/1974 | Drees et al. | 360/122 X |
| 3,947,887 | 3/1976 | Platter | 360/122 X |
| 4,616,282 | 10/1986 | Sastra | 360/122 |

FOREIGN PATENT DOCUMENTS 0119523  7/1984  Japan .................................. 360/122

OTHER PUBLICATIONS

Legios, "Magnetic Head", *IBM-TDB*, Dec. 1980, vol. 23, No. 7A, pp. 2845-2846.
Chow et al., "Bidirectional Magnetic Head", *IBM-TDB*, Feb. 1972, vol. 14, No. 9, 2631-2632.
Constantin, "Magnetköpfe mit hyperbolischem Spiegelanschliff", *Radio Mentor Electronic*, Mar. 1968, vol. 34, pp. 158-159.
Bullock et al., "Self-Cleaning Cleaner Block for Cleaning", *Flexible Media*, Jan. 1976, vol. 18, No. 8, pp. 2419-2420.

Primary Examiner—John H. Wolff
Assistant Examiner—David J. Severin

[57] ABSTRACT

A self-cleaning head assembly characterized by one or more raised head islands with convex top surfaces and sloped sides, and designed to be used with a recording medium, such as a magnetic tape, which wraps each island. The machined radius of curvature of the top surface of the head island is not less than half the natural curvature of the tape, and the running radius of the head is approximately equal to the natural curvature of the medium. A steep angle of approach between tape and head provides cleaning action, while the small top surface reduces errors due to lift-off and provides superior magnetic contact.

3 Claims, 2 Drawing Sheets

NARROW CONTOUR HEAD ASSEMBLY

This application is a continuation of application Ser. No. 669,410, filed Nov. 11, 1984 abandoned.

BACKGROUND OF THE INVENTION

This invention relates to a unique head structure for a digital magnetic recording assembly.

The basic head assembly for a digital magnetic recording device, such as a reel-to-reel tape drive, consists of an approximately U-shaped core made from some high permeability material, with a small non-magnetic gap at the top and an electric coil wound around the base of the core. The tape or other magnetic media moves across the gap at a predetermined distance, usually on the order of $10^{-4}$–$10^{-5}$ inches.

In the write operation, a time-varying electric current is sent through the coil to produce a time-varying magnetic field in the core. The magnetic flux lines bridge the non-magnetic gap and create a fringe field above it, which in turn lays down a spatially varying magnetic pattern on the tape. In the read operation, the magnetic pattern on the tape induces a time-varying magnetic field in the core and an associated current in the coil.

Thus, successful recording depends on precise control of the contact between the tape and the fringe field. Both the tape-head distance and the tangential pressure of the tape on the head must be maintained within very narrow tolerances at the gap. if the distance there is too great and the pressure too low, the tape may not record. On the other hand, too small a distance or too great a pressure may cause physical damage to the tape or head, or the recording of phantom signals. Even small variations can lead to erratic recording performance.

In the prior art, wide island heads have been widely used. In these heads, the core is embedded in, and flush with the surfaces of, hard, highly polished sliders made from materials such as chrome. The rapidly moving tape carries air with it, and the pressure of the air trapped between the tape and the smoothly curved surfaces of the sliders creates an aerodynamic cushion for the tape, whose height or thickness is proportional to the speed of the tape. The tape travels over the sliders for a considerable distance on either side of the head, as much as $5 \times 10^{-2}$ inches in all, during which this controlled aerodynamic separation is maintained. In the past, it was believed that the smooth, continuously curved slider of the wide island head was required to avoid turbulence at the gap and maintain the cushion reliably within the required tolerances.

Wide island heads do provide a reliable aerodynamic cushion. The cushion alone, however, does not ensure good contact between the tape and the magnetic field for the life of the recording assembly. Relatively high pressures are required to provide contact on the wide, flat surface of the head, so the entire head wears quickly, and the soft core wears much more quickly than the sliders. As the core wears down, the distance between the tape and core increases so that the signals lose resolution and the noise on the tape increases. This leads to signal losses on the recording tracks and, even worse, synchronization failures on the timing track which can make the tape unusable. Eventually, and in commercial tape assemblies often as frequently as every six months, the sliders must be ground down, a complex and expensive procedure which involves taking apart, reassembling and recalibrating the entire tape drive. Since cores cannot be replaced onsite, the tape drive must be "down" for several weeks per year while the cores are being replaced.

Even before significant wear takes place, wide island heads are particularly susceptible to errors caused by non-uniformities in the tape and contaminants. Non-conductive contaminants merely blanket the signal over the area of contamination but conductive contaminants and high-spots in the tape can cause a false signal over the entire width of the head. Thus, the error rate on the tape increases exponentially with the width of the head.

SUMMARY OF THE INVENTION

It is an object of this invention to provide a head structure with a small surface area to reduce the severity of errors caused by conductive contaminants and high-spots in the tape.

It is another object of this invention to provide a head assembly which permits reduced tape tension while maintaining contact between the tape and the magnetic field.

It is also an object of this invention to provide a self-cleaning head structure to further reduce errors from contaminants.

It is a further object of this invention to provide a longer wearing head structure.

The invention is a self-cleaning head assembly characterized by one or more raised head islands with convex top surfaces and sloped sides. A recording medium wraps each island, and the angle of approach between each side of the island and the medium is at least 10°. The width of the top surface of each island is small in proportion to that of a prior art wide island, preferably no wider than 150/D, where D is the storage density of the recording medium. The machined radius of curvature of the top surface of the head island is not less than half the natural curvature of the tape, and the running radius of the head assembly is approximately equal to the natural curvature of the tape. In the preferred embodiment, the tape path is multi-angled, passing over one or more non-conducting outrigger islands which clean and steady the tape.

DETAILED DESCRIPTION OF THE INVENTION

Figure 1:
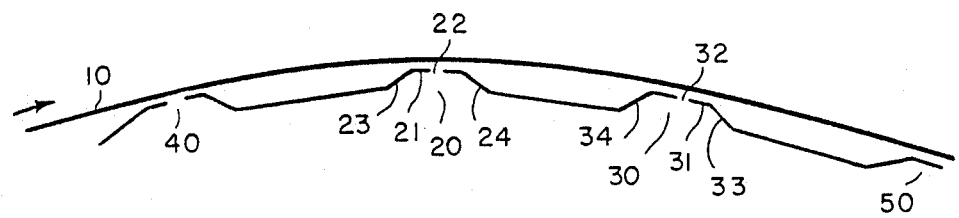
FIG. 1 is a cross-sectional diagram of a paired head assembly for a flexible tape drive embodying the invention.

Preferred embodiments of this invention will be described with reference to the accompanying drawings, but these are intended only as illustrations of, and not as limitations to my invention. Thus, for example, the invention will be described with reference to a paired head assembly for a tape drive but it will be understood that other head configurations and other recording media might be used. A paired head assembly for a magnetic tape drive is shown in cross-section in FIG. 1. In a paired head assembly, a given section of the tape is first written upon by the write head and immediately thereafter checked by the read head. A tape, 10, is drawn over the surfaces of the write and read heads, generally designated by the numerals 20 and 30 respectively, and of outrigger islands, 40 and 50, whose function will be discussed later.

At the midpoint between the read and write heads, the tape path is horizontal. Because it is difficult to precisely control the tension of a horizontal tape, most designers cause the tape to climb uphill at a slight angle over the write head and then to pass downhill at a slight angle over the read head. Prior art designs have, however, attempted to make this transition as gradual as possible so as to maintain nearly constant spacing between the tape and head surface over the entire head assembly by the use of wide, smooth sliders mounted flush with the heads. In contrast, the head island of my invention features a convex raised top surface and sloping sides; in cross-section it roughly resembles the frustum of a cone.

The heads 20 and 30 are made from a high permeability material, preferably a ceramic. The top surface, 21, of the write head is broken by a write gap, 22. Similarly, the top surface, 31, of the read head is broken by a read gap, 32, through which the magnetic pattern on the tape intereacts with the field surrounding the head core.

Figure 2:
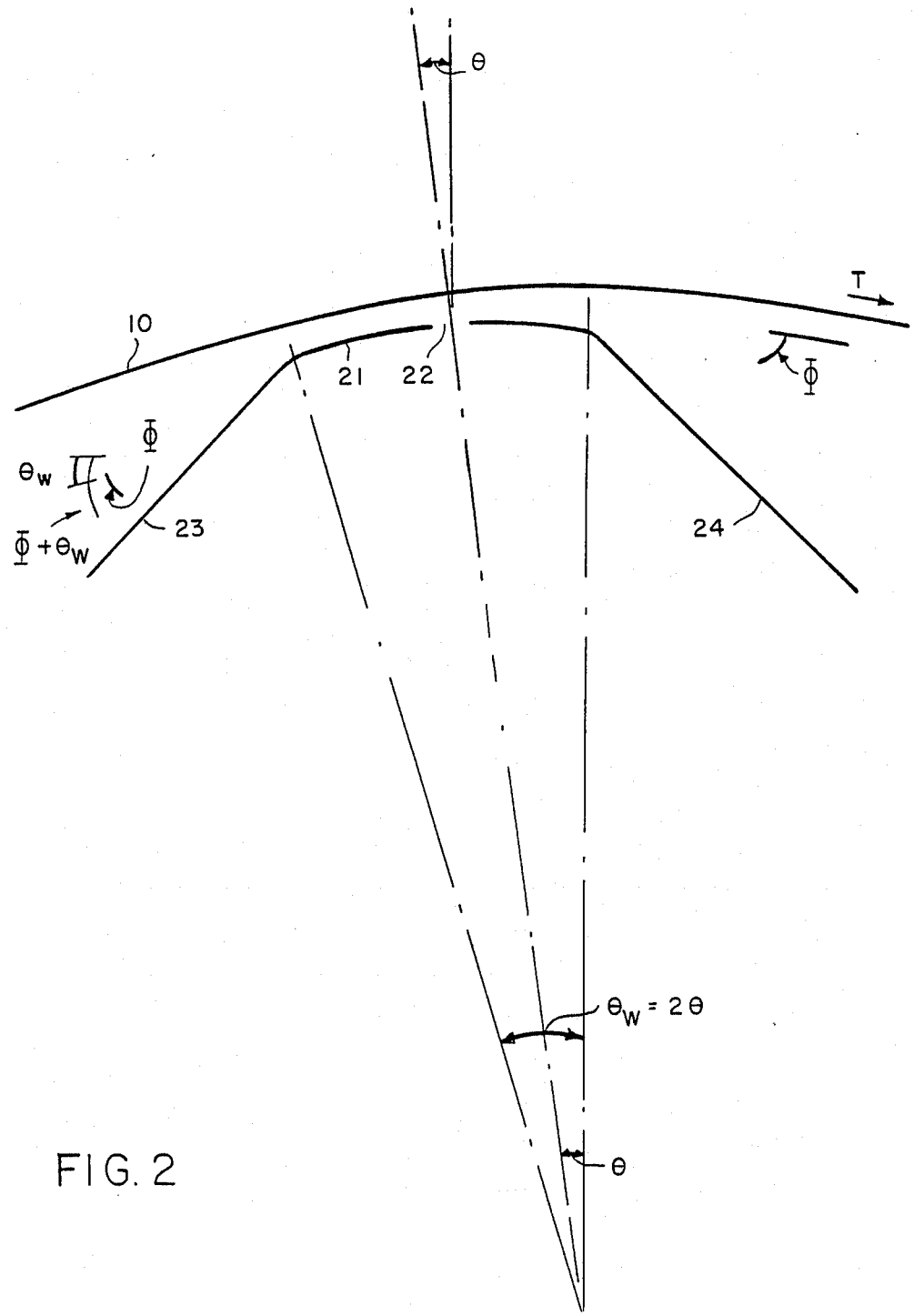
FIG. 2 is a detailed diagram of the island, 20, from FIG. 1, more specifically showing its contour and orientation.

Referring now to FIG. 2, it will be seen that the centerline of write head, 20, is oriented at an angle $\theta$ to the vertical and the tape, 10, wraps it at an angle $\theta_w = 2\theta$. The sides, 23, and 24, of write head 20 are sloped, with respect to the horizontal, at angles $\Phi$ and $(\theta_w + \Phi)$ respectively so that the angle of approach between the tape, 10, and each side of the head is $\Phi$. For balance, in a paired head assembly it is preferred that the read head be designed so that all angles are equal in magnitude (though opposite in sign) to those for the write head. Thus, the centerline of read head, 30, is oriented at an angle $\theta'$ to the vertical and the tape, 10, wraps it at an angle $\theta_w' = 2\theta'$. Similarly, the sides, 33 and 34 of read head 30 are sloped at angles $\Phi + \theta_w'$ and $\Phi'$ respectively so that the angle of approach between the tape, 10, and each side of the head is $\Phi'$. In the assembly of my invention, $\Phi$ should be at least about 10°. In contrast to prior art head assemblies, which attempted to maintain a uniform air cushion beneath the tape, my assembly deliberately creates reduced tape-to-head spacing and large pressure gradients at the edges of the top surface of the head. In effect, the air cushion and any contaminants which may have been picked up by a given section of tape are scraped off just before that section passes over the head gap. The tape is thus self-cleaning. At angles smaller than about 10° however, the air cushion is dragged along with the tape and this self-cleaning action is not observed. The preferred range for $\theta$ is between 10° and 15°. At much larger angles, the sharp corners of the head can act like small antennae, emitting radiation and creating false signals known as contour pulses on the tape. Moreover, the tape-to-head spacing is not uniform across the width of the tape, becoming increasingly non-uniform as $\theta$ increases beyond about 15°. At sharper angles the structural integrity of the ceramic material suffers and machining, polishing and/or tape interaction with sharp edges may cause chipping or fracturing of these edges.

The top width of my island the wrap angle $\theta_w$ for my heads are chosen to provide control over the flutter in the tape as it passes over the head and also over the pressure exerted on the head. It should be noted in passing that for a head radius of curvature greater than the natural radius of the tape the wrap angle equals the angle included by the top surface of the head, and this is approximately true when the radius is slightly less than the natural radius.

My invention features an island which is narrower by a factor of at least 3 than prior art wide islands. For my invention, the width of the island need not be greater than 150/D, where D is the storage density of the tape in bits per inch. I prefer an island width in the range of about 120/D to about 150/D, typically about 0.006 to about 0.01 inches.

Figure 3:
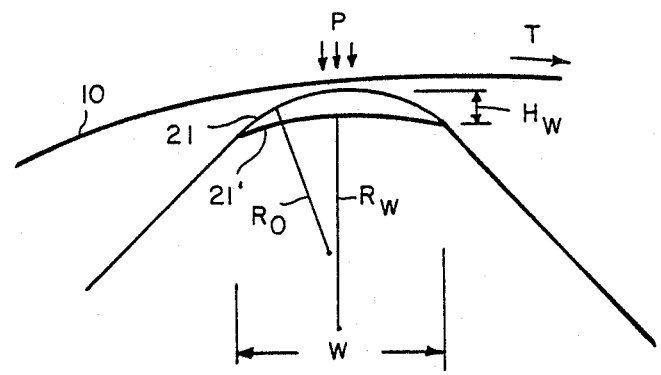
FIG. 3 is a detailed diagram of a head island, showing the machined and final head contours, and indicating the effects of wrap angle and island width on head pressure.

The narrow island has numerous advantages. It permits good contact between the tape and magnetic field at reduced drive tensions. As illustrated in FIG. 3, the pressure P on the head, in pounds per unit tape width, is determined by the following formula, where T is the tension on the tape per unit width and W the width of the island:

$$P = T/W \times 2 \tan(\theta_w/2) \sim T\theta_w \text{ (for } \theta_w/2 < 5°\text{)}$$

For good contact between the tape and the magnetic field, it is desirable that the pressure on the head be not less than about 6 psi, and because unduly high pressures increase wear on both tape and head, it is preferred that the pressure not exceed 10 psi. The wrap angle $\theta_w$ is a fine-tuning device to balance the island width and psi loading; angles in a range of about 5° to about 10° are preferred.

It will be seen from the equation above that a reduction in island width W by a given factor allows a reduction of the same magnitude in the drive tension without affecting the head pressure.

The use of lower drive tensions increases the life of the tape by reducing wear, and makes it possible to use smaller motors with lower power requirements whose smaller electric fields are less likely to cause false signals on the tape.

It is a feature of my invention that the final radius of curvature of the head, its running radius, approximates the "natural curvature" of the tape. This "natural curvature," which is the radius of the smallest circle the tape can form without breaking, is determined by the inherent stiffness of the tape N, the tension, T, applied to it, and the wrap angle $\theta_w$, in accordance with the formula $\theta_w R_n = 2N/T$.

It will be noted that N, being an inherent property of the tape, is predetermined. For currently available magnetic tapes it is on the order of 0.0001 ($10^{-4}$). The tension, T, is also constrained by external factors such as the power of the drive motors and the tensile strength of the tape itself, and, as I have mentioned, it is desirable that T be kept as small as is consistent with maintaining good contact between the tape and the magnetic field. It has been found that heads with a machined radius substantially shorter than the natural radius have erratic recording behavior early in the head life due to lift off of the tape from the head. The head will wear down rapidly and, because of lift-off, irregularly, creating a large volume of debris which tends to stick to the tape causing high error rates. Because of the wear-in irregularities, the head may never attain a smooth steady-state radius, but may continue to have a significant wear rate throughout the head life. Heads whose machined radii are substantially longer than the natural radius of curvature of the tape also have been found to wear irregularly. In contrast, heads with an initial machined radius of curvature no less than about half the natural radius have been found to wear in rapidly without much lift-off to a contour approximating the natural curvature of the tape, and to have negligible wear thereafter. As a result, an extremely long head life can be expected. It is preferred that the machined radius be from $\frac{1}{2}$ to $\frac{2}{3}$ of the natural radius of curvature of the tape.

Referring now to FIG. 3, a head with an initial surface, 21, at an initial radius of curvature, $R_o$, is shown. If the natural radius of curvature, $R_w$, of the tape, 10, is slightly less than $R_o$, it will be seen that the head will tend to wear down to a final surface, 21′, with a radius of curvature equal to $R_w$. The vertical head loss to wear, and hence the possible contamination due to debris, is proportional to the inverse of the differences between the initial and final radii and also proportional to the square of the island width.

$$H_w \sim (\tfrac{1}{2}R_o - \tfrac{1}{2}R_w) \times W\,2/4$$

Thus, it will be seen that the narrow contour island of my invention greatly reduces the likelihood of contamination from weardown debris. In addition, the steep slope of the head provides a "trap" into which the debris can fall so that it does not adhere to the tape.

There are other advantages to the long radius of curvature and narrow top width of my head. Pressure is essentially constant over the short width of the head, reducing damage from flutter. As has been mentioned, the severity of lift-off errors increases exponentially with the width of the head; a hundred-fold decrease in error rates over prior art heads has been found with the head of my invention.

Referring again to FIG. 1, it will be seen that in the preferred embodiment of the invention, the tape, 10, passes over outrigger islands, 40 and 50, on either side of the head islands 20 and 30. These outrigger islands are made from a low permeability material of substantially the same hardness as the head material, such as low permeability ceramic. The outrigger islands are preferably substantially identical in size and contour to the head islands. They provide an additional cleaning action for the tape. The wrap around the "extra" island is also functionally equivalent to doubling the wrap angle at the head, providing improved tension and flutter control without the wear at the tape edges which a single large wrap angle would cause.

In summary, the head assembly of my invention features one or more steeply sloped, raised head islands approached by the tape at an angle greater than about 10° and wrapped by the tape at an angle between about 5° and 10°. It also features a narrow convex top surface whose radius of curvature approximates the natural radius of curvature of the tape. It has been shown that these features work together to provide the unique advantages described. Thus, the steeply sloped head contour, the constraints on the machined head radius, and the narrow top width minimize contamination during the initial weardown of the head to its running radius while the choice of radius ensures that the weardown phase is short and wear thereafter minimal. The sloping head contour by an air tunnel effect cleans the tape and provides a trap for debris. The small island size reduces errors caused by contamination. The small island size, the choice of included, i.e., wrap angle, and a running radius which approximates the natural radius of curvature minimize wear on the tape.

What I claim is:

1. A head assembly for a magnetic tape drive including a transport for moving a magnetic tape along a tape path, said tape having a natural radius of curvature, a portion of said tape path located in close proximity to the head assembly whereby the head assembly may read or write data upon the tape, said assembly comprising:
   (A) the head assembly having a generally arcuate outer surface which the tape passes adjacent thereto;
   (B) a write island integral with said head assembly and projecting above said head assembly outer surface, said write island having an arcuate top surface spaced from said head assembly outer surface with a radius substantially equal to the natural radius of curvature of the tape, and write island sides that extend between said head assembly outer surface and said write island top surface, said write island sides being planar and extending downward from the line defined by the end points of the write island top surface by at least 10°; and
   (C) a read island integral with said head assembly projecting above said head assembly outer surface, and spaced away from said write head so that there is an arcuate portion of said head assembly arcuate outer surface therebetween, said read island having an arcuate top surface spaced from said head assembly outer surface with a radius substantially equal to the natural radius of the tape, and read island sides that extend between said head assembly outer surface and said read island top surface, the line defined by the end points of the read island top surface by at least 10°.

2. The head assembly of claim 1 further including:
   (A) a first guide island integral with and projecting above said head assembly outer surface, said guide island spaced away from said write island opposite to the direction where said read island is oriented, said first guide island having a first guide island arcuate top surface spaced away from said head assembly outer surface, said first guide island top surface having a radius of curvature substantially equal to the natural radius of the tape, and first guide island sides that extend between said head assembly outer surface and said first guide island top surface, said first guide island sides being planar and extending downward from the line defined by the end points of the first guide top surface by at least 10°; and
   (B) a second guide island integral with and projecting above said head assembly outer surface, said second guide island spaced away from said read island opposite to the direction where said write island is located, and spaced away a sufficient distance so that there is a portion of said head assembly outer surface between said read island and said second guide island, said second guide island having an arcuate top surface spaced away from said head assembly outer surface, with said second guide island having a radius of curvature substantially equal to the natural radius of the tape, and second guide island sides that extend between said head assembly outer surface and said second guide island top surface, said sides extending downward from the line defined by the end points of the second guide top surface by at least 10°.

3. The head assembly of claim 2 wherein said write island top surface, said read island top surface, said first guide island top surface, and said second guide island top surface each subtend an angle between 5° and 10° inclusive.

UNITED STATES PATENT AND TRADEMARK OFFICE
CERTIFICATE OF CORRECTION

PATENT NO. : 4,809,110
DATED : February 28, 1989
INVENTOR(S) : Friedrich R. Hertrich It is certified that error appears in the above-identified patent and that said Letters Patent is hereby corrected as shown below:

Column 4,
Line 20, replace "2 tan $(\theta_w 2)$" with -- 2 tan $(\theta_w/2)$ --.
Line 46, replace "$\theta_w R_n = 2N/T$" with -- $\theta_w R_n = 2\sqrt{N/T}$ --.

Column 5,
Line 17, replace "$H_w \sim (^1/_2 R_o - ^1/_2 R_w) \times W2/4$" with -- $H_w \sim \left( \dfrac{1}{2Ro} - \dfrac{1}{2Rw} \right) \times W^2/4$ --.

Signed and Sealed this

Sixth Day of January, 2004

JAMES E. ROGAN
*Director of the United States Patent and Trademark Office*